United States Patent [19]
Klier et al.

[11] Patent Number: 5,984,978
[45] Date of Patent: Nov. 16, 1999

[54] REACTIVE DYES, THEIR PREPARATION AND USE

[75] Inventors: Herbert Klier, Efringen-Kirchen, Germany; Athanassios Tzikas, Pratteln, Switzerland

[73] Assignee: Ciba Specialty Chemicals Corporation, Tarrytown, N.Y.

[21] Appl. No.: 09/019,635

[22] Filed: Feb. 6, 1998

[30] Foreign Application Priority Data

Feb. 7, 1997 [CH] Switzerland .............................. 273/97

[51] Int. Cl.⁶ .................................................. C09B 67/26
[52] U.S. Cl. .............................................. 8/527; 534/634
[58] Field of Search .................................. 534/634; 8/527

[56] References Cited

U.S. PATENT DOCUMENTS

| | | | |
|---|---|---|---|
| 4,843,150 | 6/1989 | Hihara et al. | 534/634 |
| 5,175,259 | 12/1992 | Jessen et al. | 534/606 |
| 5,232,462 | 8/1993 | Tzikas | 8/549 |

FOREIGN PATENT DOCUMENTS

| | | |
|---|---|---|
| 1063600 | 10/1979 | Canada. |
| 0252508 | 1/1988 | European Pat. Off.. |
| 0478503 | 4/1992 | European Pat. Off.. |
| 0503339 | 9/1992 | European Pat. Off.. |
| 1461125 | 1/1977 | United Kingdom. |
| 2289053 | 11/1995 | United Kingdom. |
| 9318224 | 9/1993 | WIPO. |

OTHER PUBLICATIONS

Chemical Abstracts Service, Registry Handbook, 1996 Supplement, Part 3, p. 4415RY, Registry No. 178198–11–3, 1997.

*Primary Examiner*—Fiona T. Powers
*Attorney, Agent, or Firm*—Kevin T. Mansfield

[57] ABSTRACT

There are described reactive dyes of formula

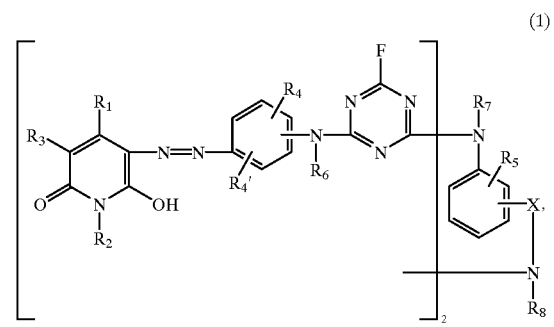

(1)

wherein the variables are as defined in the claims. The reactive dyes of formula (1) are suitable especially for dyeing or printing cellulosic fiber materials.

10 Claims, No Drawings

REACTIVE DYES, THEIR PREPARATION AND USE

The present invention relates to novel reactive dyes, to processes for their preparation and to their use in dyeing or printing textile fibre materials.

The practice of dyeing using reactive dyes has recently led to greater demands on the quality of the colourings and on the economic viability of the dyeing process. As a result, there is still a need for novel reactive dyes that have improved properties, especially in respect of their application.

Dyeing nowadays requires reactive dyes that have adequate substantivity and, at the same time, that allow easy washing-off of unfixed product. Moreover, they should have a good tinctorial yield and high reactivity, the objective being to provide especially colourings that have high fixation levels. Those requirements are not met by the known dyes in all their properties.

The problem underlying the present invention is accordingly to find for dyeing and printing fibre materials novel, improved reactive dyes that have the above-mentioned qualities to a high degree. The novel dyes should especially be distinguished by high fixation yields and high fibre/dye bond stabilities; moreover, it should be possible for product that is unfixed to the fibre to be washed off easily. They should also yield colourings having good allround properties, for example light-fastness and wet-fastness.

It has been demonstrated that the problem posed is largely solved by the novel reactive dyes defined hereinafter.

The present invention relates to reactive dyes of formula

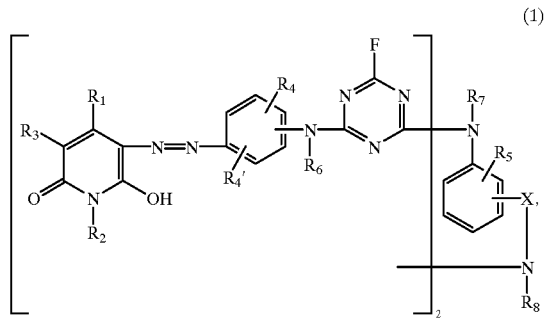

(1)

wherein $R_1$ and $R_2$ are $C_1$–$C_4$alkyl,
$R_3$ is cyano, carbamoyl or sulfomethyl,
$R_4$ and $R_4'$ are each independently of the other hydrogen, sulfo, $C_1$–$C_4$alkyl, $C_1$–$C_4$alkoxy or halogen,
$R_5$ is hydrogen, $C_1$–$C_4$alkyl, $C_1$–$C_4$alkoxy or halogen,
$R_6$, $R_7$ and $R_8$ are hydrogen or $C_1$–$C_4$alkyl, and
X is a direct bond or a radical of the formula —$(CH_2)_{1-4}$—.

There come into consideration as $C_1$–$C_4$alkyl radicals for $R_1$, $R_2$, $R_4$, $R_4'$, $R_5$, $R_6$, $R_7$ and $R_8$, for example, methyl, ethyl, propyl, isopropyl, butyl, sec-butyl, tert-butyl or isobutyl, especially methyl or ethyl.

There come into consideration as $C_1$–$C_4$alkoxy for $R_4$, $R_4'$ and $R_5$, for example, methoxy, ethoxy, propoxy, isopropoxy, butoxy or isobutoxy, especially methoxy.

There come into consideration as halogen for $R_4$, $R_4'$ and $R_5$ fluorine, chlorine or bromine, especially chlorine.

$R_1$ is preferably methyl. In the case of the radical $R_2$, the preferred meaning is ethyl.

The radical $R_3$ is preferably sulfomethyl.

$R_4$ is preferably hydrogen or sulfo, especially sulfo.

$R_4'$ is preferably hydrogen or sulfo, especially hydrogen.

$R_5$ is preferably hydrogen, $C_1$–$C_4$alkyl or $C_1$–$C_4$alkoxy, especially hydrogen.

$R_6$, $R_7$ and $R_8$ are preferably hydrogen.

X is preferably a direct bond or a radical of the formula —($CH_2$)—, especially a direct bond.

Preference is given to reactive dyes of formula (1) wherein $R_1$ is methyl, $R_2$ is ethyl, $R_3$ is sulfomethyl, $R_4$ is sulfo, $R_4'$, $R_5$, $R_6$, $R_7$ and $R_8$ are hydrogen and X is a direct bond.

Especially preferred reactive dyes of formula (1) are those of formula

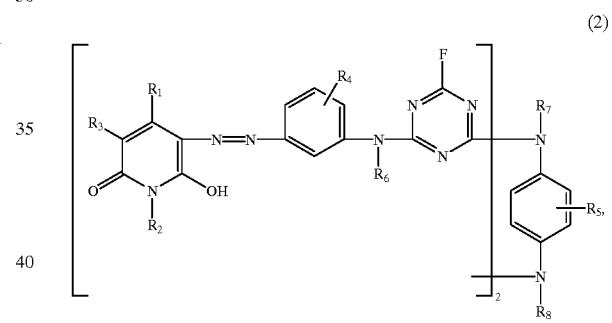

(2)

wherein the meanings and preferences given above for $R_1$, $R_2$, $R_3$, $R_4$, $R_5$, $R_6$, $R_7$ and $R_8$ apply.

Very special preference is given to reactive dyes of formula

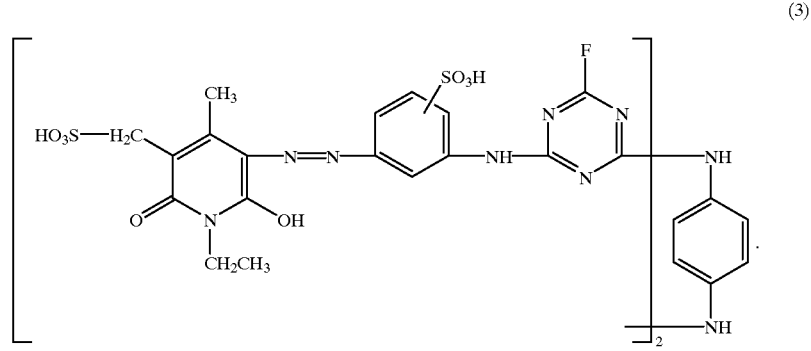

(3)

The reactive dyes according to the invention contain preferably from two to four, especially four, sulfo groups, which are either in the form of the free acid or preferably in the form of a salt. There come into consideration as salts, for example, alkali metal, alkaline earth metal or ammonium salts, salts of an organic amine or mixtures thereof. Examples thereof include sodium, lithium, potassium or ammonium salts and also the salt of mono-, di- or tri-ethanol-amine.

The present invention relates also to a process for the preparation of reactive dyes of formula (1), which process comprises reacting a compound of formula

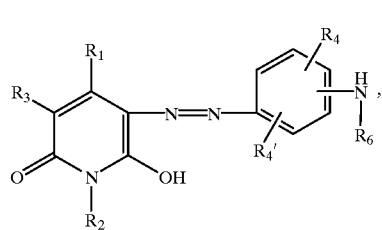

(4)

cyanuric fluoride and a diamine of formula

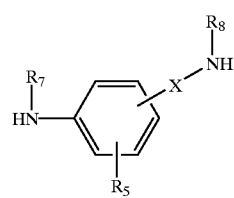

(5)

with one another in any order, with $R_1$, $R_2$, $R_3$, $R_4$, $R_4'$, $R_5$, $R_6$, $R_7$, $R_8$ and X being as defined above.

The individual process steps given above may be carried out in varying order, where appropriate to some extent also simultaneously, with the result that there are various possible process variants. The reaction will generally be carried out in successive steps, the order of the simple reactions between the individual reaction components advantageously being dependent upon the particular conditions.

One process variant comprises condensing a compound of formula (4) with cyanuric fluoride and reacting the resulting product with a diamine of formula (5).

The individual condensation reactions are carried out, for example, in accordance with methods known per se, generally in aqueous solution, at a temperature of, for example, from 0 to 10° C., especially from 0 to 5° C., and at a pH value of, for example, from 6 to 8.

The compounds of formulae (4) and (5) are known or can be prepared analogously to known compounds.

The dyes according to the invention are fibre-reactive. Fibre-reactive compounds are to be understood as being those compounds that are capable of reacting with the hydroxy groups of cellulose, with the amino, carboxy, hydroxy or thiol groups in wool and silk, or with the amino and, where appropriate, with the carboxy groups of synthetic polyamides, with the formation of covalent chemical bonds.

The dyes according to the invention are suitable for dyeing and printing an extremely wide variety of materials, such as hydroxy-group-containing or nitrogen-containing fibre materials. Examples thereof include silk, leather, wool, polyamide fibres and polyurethanes, and especially cellulosic fibre materials of all types. Those cellulosic fibre materials are, for example, natural cellulose fibres, such as cotton, linen and hemp, and also cellulose and regenerated cellulose. The dyes according to the invention are suitable also for dyeing and printing hydroxy-group-containing fibres that are contained in blend fabrics, for example mixtures of cotton with polyester fibres or polyamide fibres. The dyes according to the invention are especially suitable for dyeing or printing cellulosic fibre materials, especially cotton-containing fibre materials.

Customary dyeing and printing processes can be used. In addition to water and the dyes, the dye liquors or print pastes may contain further additives, for example wetting agents, antifoams, levelling agents or agents affecting the property of the textile material, for example softeners, flame-proofing additives or dirt-, water- and oil-repellants and water-softeners and natural or synthetic thickeners, for example alginates and cellulose ethers.

For the process, the amounts in which the reactive dyes are used in the dye baths may vary according to the desired depth of shade; generally amounts of from 0.01 to 10% by weight, especially from 0.01 to 6% by weight, based on the goods to be dyed, have proved to be advantageous.

The preferred process is dyeing, especially dyeing using the exhaust process.

In accordance with the exhaust process, dyeing is generally carried out in an aqueous medium, in a liquor ratio of, for example, from 1:2 to 1:60, especially a liquor ratio of from 1:5 to 1:20, and at a temperature of from 20 to 105° C., especially from 30 to 90° C., and preferably from 40 to 80° C.

Also suitable is the foulard dyeing process, in which the goods are generally impregnated with aqueous, where appropriate salt-containing, dye solutions. The liquor pick-up in that process is, for example, from 20 to 150%, especially from 40 to 120% and preferably from 50 to 100%, based on the weight of the fibre material to be dyed. The liquor may already contain fixing alkali, or the fibre material is treated with fixing alkali after impregnation. There come into consideration as alkali, for example, sodium carbonate, sodium hydrogen carbonate, sodium hydroxide, disodium phosphate, trisodium phosphate, borax, aqueous ammonia, sodium trichloroacetate, sodium formate or a mixture of water glass and an aqueous sodium carbonate solution. Preference is given to alkali hydroxide and/or alkali carbonate, especially sodium hydroxide and/or sodium carbonate.

Fixing can be carried out, for example, by the action of heat, such as by steaming the impregnated fibre material at a temperature of, for example, from 100 to 120° C., preferably in saturated steam. In accordance with the so-called cold pad-batch process, the dye is applied together with the alkali to the foulard and thereafter fixed by several hours' storage, for example from 3 to 40 hours, at room temperature. After fixing, the colourings or prints are rinsed thoroughly, optionally with the addition of a dispersant.

The colourings and prints obtained are distinguished by good build-up and good levelness. The fixation levels are high and the unfixed product can be washed off easily, the difference between the exhaustion level and the fixation level being small, that is to say soap loss is low. The colourings and prints obtained according to the process have a high tinctorial strength and a high fibre/dye bond stability, and also good light-fastness and very good wet-fastness, such as fastness to washing, water, seawater, crossdyeing and to perspiration, and also good fastness to pleating, ironing and to rubbing.

The present invention relates also to concentrated, aqueous formulations that contain from 5 to 50% by weight of at least one reactive dye of formula (1) given above. The meanings and preferences given above apply to the reactive dyes of formula (1).

The aqueous formulations according to the invention preferably contain from 5 to 40% by weight, especially from 10 to 40% by weight, more especially from 10 to 30% by weight, of at least one reactive dye of formula (1).

The formulations preferably have a pH value of from 3 to 8, especially from 3 to 7 and more especially from 4 to 7. The pH value is adjusted using a buffer, for example by the addition of a polyphosphate or a hydrogen/dihydrogen phosphate buffer. Other buffers that may be mentioned include sodium or potassium acetate, sodium or potassium oxalate and sodium borate, and also mixtures thereof.

The formulations may also comprise a component that improves the water-solubility of the dye, for example ε-caprolactam or N-methylpyrrolidone. Such components are generally used in an amount of from 0.1 to 30% by weight, based on the total weight of the formulation.

The formulations may also comprise property-improving auxiliaries, such as surfactants, antifoam auxiliaries, antifreezes or agents that prevent fungal and/or bacterial growth. Such auxiliaries are generally present in very small amounts, for example in each case approximately from 1 to 10 g/l.

The formulations according to the invention are storage-stable over a prolonged period and are liquid, and can be used for dyeing especially in the above-mentioned processes.

The dyes according to the invention are distinguished by high reactivity, good fixation and very good build-up. Accordingly, they can be used in the exhaust dyeing process at low dyeing temperatures and, in the pad-steam process, require only short steam times. The fixation levels are high and unfixed product can be washed off easily, the difference between the exhaustion level and the fixation level being remarkably small, that is to say soap loss is very low.

The colourings and prints produced with the dyes according to the invention have a very high tinctorial strength and a high fibre/dye bond stability, in both the acidic and alkaline range, and also good light-fastness and very good wet-fastness, such as fastness to washing, water, seawater, cross-dyeing and to perspiration, and also good fastness to pleating, ironing and to rubbing.

The following Examples serve to illustrate the invention. The temperatures are given in degrees Celsius, parts are parts by weight, percentages relate to % by weight, unless indicated to the contrary. Parts by weight in relation to parts by volume are in the ratio of kilogrammes to liters.

EXAMPLE 1

44.7 parts of the compound of formula

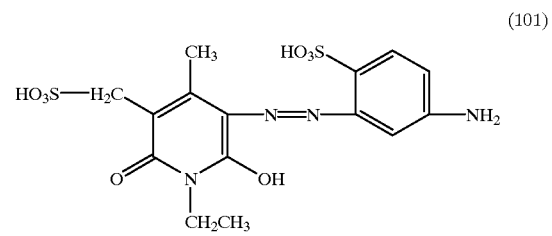

are dissolved in 300 parts of water with the addition of approximately 13 parts of a 5N aqueous sodium hydroxide solution and approximately 5 parts of trisodium phosphate. Then, at a temperature of 0° C., 6.9 parts of cyanuric fluoride are added dropwise, the pH value being held constant by the addition of 5N aqueous sodium hydroxide solution. Once the reaction is complete, a solution of 5.4 parts of 1,4-phenylenediamine in 150 parts of water is added dropwise at a temperature of 0° C. in such a manner that the pH does not exceed a value of 7 and the pH is maintained at a value of 7. The mixture is allowed to warm to room temperature, the solution is freed of salt by dialysis and the resulting product is freeze-dried. A dye is obtained that, in the form of the free acid, corresponds to formula

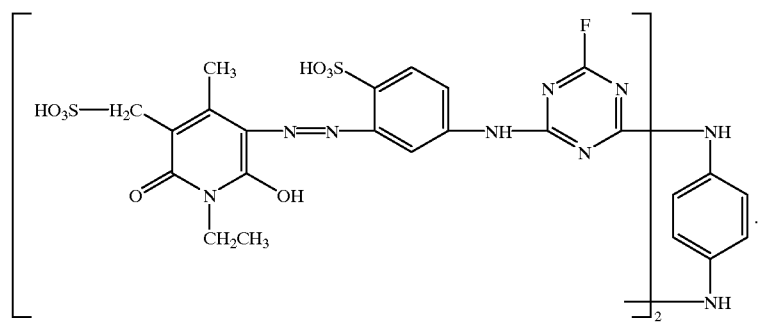

The resulting dye will dye cotton in shades of yellow.

EXAMPLES 2 to 10

The dyes indicated in column 2 of the following Table, which will dye cotton in shades of yellow, can be obtained in a manner analogous to that given in Example 1.

TABLE 1
| Ex. | Dye |
|---|---|
| 2 | 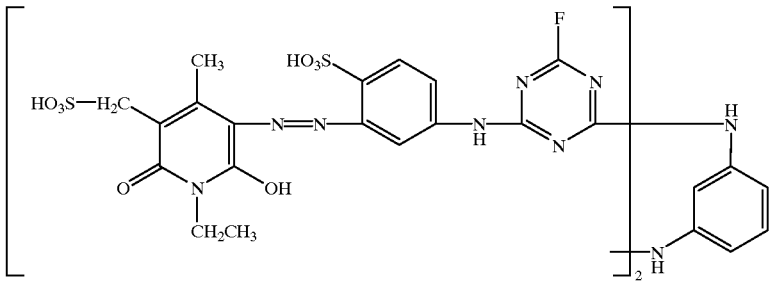 |
| 3 | 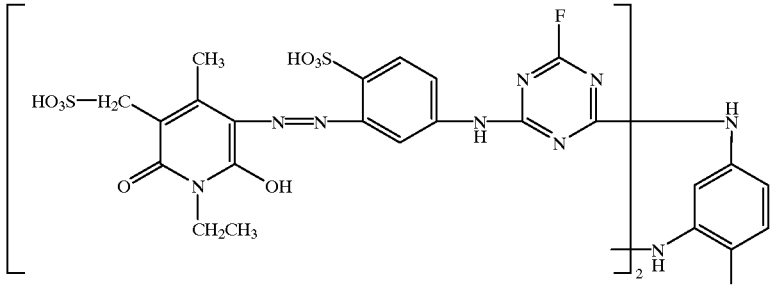 |
| 4 | 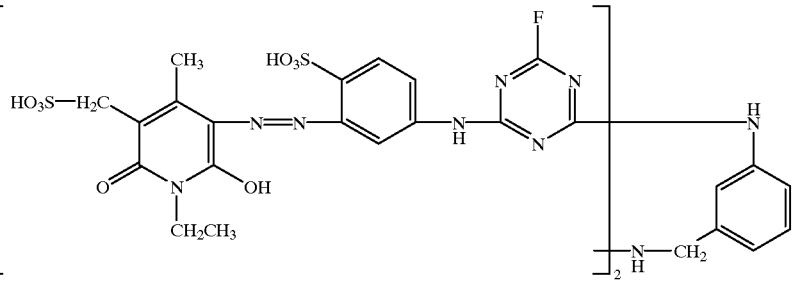 |
| 5 | 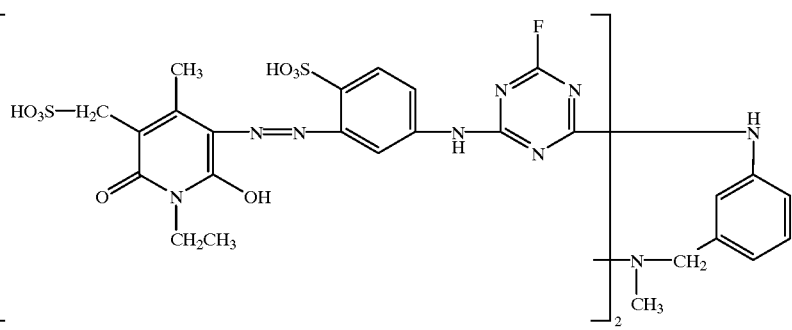 |

TABLE 1-continued

| Ex. | Dye |
|---|---|
| 6 | (structure) |
| 7 | (structure) |
| 8 | (structure) |
| 9 | (structure) |

TABLE 1-continued

| Ex. | Dye |
|---|---|
| 10 | 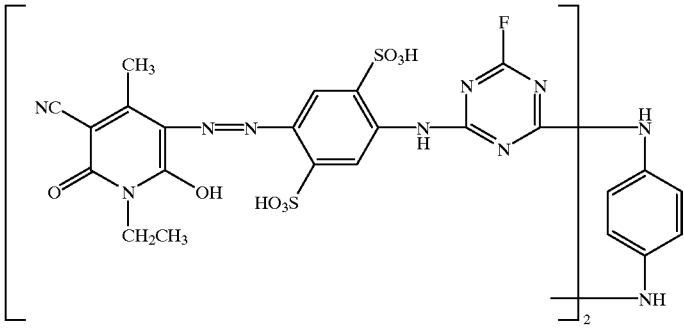 |

Dyeing procedure 2 parts of the dye of formula (102) obtained according to Example 1 and 20 parts of sodium chloride are dissolved at a temperature of 70° C. in 1000 parts of water. 100 parts of cotton fabric are placed in the dye bath and the temperature is maintained at 70° C. for 30 minutes. 4 parts of calcined sodium carbonate are then added and the temperature is maintained at 70° C. for a further 15 minutes. After the addition of 8 parts of calcined sodium carbonate, dyeing is continued at 70° C. for a further 45 minutes and then the goods are rinsed and dried in customary manner.

Printing procedure 3 parts of the dye of formula (102) obtained according to Example 1 are scattered, with rapid stirring, into 100 parts of a stock thickener containing 50 parts of 5% sodium alginate thickener, 27.8 parts of water, 20 parts of urea, 1 part of sodium m-nitrobenzenesulfonate and 1.2 parts of sodium hydrogen carbonate. A cotton fabric is printed using the resulting print paste and dried, and the resulting printed material is steamed in saturated steam at 102° C. for 2 minutes. The printed fabric is then rinsed, optionally soaped at boiling temperature and rinsed again, and subsequently dried.

What is claimed is:

1. A concentrated, aqueous formulation which comprises from 5 to 50% by weight of at least one reactive dye of formula

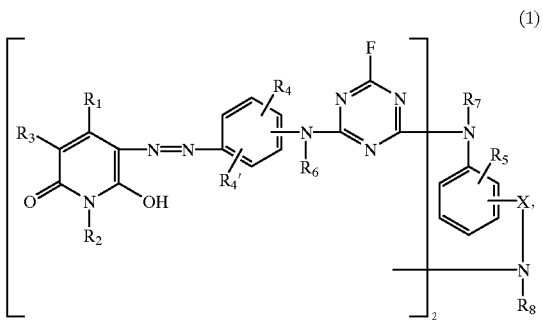

(1)

wherein $R_1$ and $R_2$ are $C_1$–$C_4$alkyl, $R_3$ is cyano, carbamoyl or sulfomethyl, $R_4$ and $R_4'$ are each independently of the other hydrogen, sulfo, $C_1$–$C_4$alkyl, $C_1$–$C_4$alkoxy or halogen, $R_5$ is hydrogen, $C_1$–$C_4$alkyl, $C_1$–$C_4$alkoxy or halogen, $R_6$, $R_7$ and $R_8$ are hydrogen or $C_1$–$C_4$alkyl, and X is a direct bond or a radical of the formula —$(CH_2)_{1-4}$—.

2. A concentrated, aqueous formulation according to claim 1, wherein $R_1$ is methyl and $R_2$ is ethyl.

3. A concentrated, aqueous formulation according to claim 1, wherein $R_3$ is sulfomethyl.

4. A concentrated, aqueous formulation according to claim 1, wherein $R_4$ is sulfo and $R_4'$ is hydrogen or sulfo.

5. A concentrated, aqueous formulation according to claim 1, wherein $R_5$ is hydrogen.

6. A concentrated, aqueous formulation according to claim 1, wherein $R_6$, $R_7$ and $R_8$ are hydrogen.

7. A concentrated, aqueous formulation according to claim 1, wherein

X is a direct bond.

8. A concentrated, aqueous formulation according to claim 1, wherein $R_1$ is methyl, $R_2$ is ethyl, $R_3$ is sulfomethyl, $R_4$ is sulfo, $R_4'$, $R_5$, $R_6$, $R_7$ and $R_8$ are hydrogen and X is a direct bond.

9. A concentrated, aqueous formulation according to claim 1, which comprises at least one reactive dye of formula

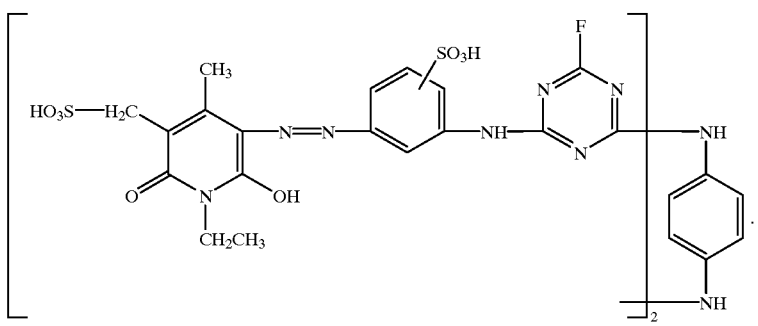
(3)
10. A concentrated, aqueous formulation according to claim 1 which comprises 10 to 30% by weight of at least one reactive dye of formula (1).
* * * * *